United States Patent [19]
Tayonaka et al.

[11] Patent Number: 5,438,444
[45] Date of Patent: Aug. 1, 1995

[54] OPTICAL ROUTING SYSTEM

[75] Inventors: Takashi Tayonaka, Hachiouji; Shinji Tsuji, Hidaka; Ryoji Takeyari, Koganei, all of Japan

[73] Assignee: Hitachi, Ltd., Tokyo, Japan

[21] Appl. No.: 118,365

[22] Filed: Sep. 8, 1993

[30] Foreign Application Priority Data

Sep. 9, 1992 [JP] Japan .................... 4-240335

[51] Int. Cl.$^6$ .................... H04J 4/00; H04J 14/00
[52] U.S. Cl. .................... 359/123; 359/140; 359/125; 359/137; 385/24
[58] Field of Search .................... 359/117–121, 359/123, 125, 127–128, 137, 139–140, 157; 370/55, 60, 66–67, 94.1–94.2, 60.1; 385/16, 24

[56] References Cited

U.S. PATENT DOCUMENTS

| | | | |
|---|---|---|---|
| 4,105,869 | 8/1978 | Aveneau et al. | 370/55 |
| 5,134,609 | 7/1992 | Mori et al. | 370/55 |
| 5,249,178 | 9/1993 | Kurano et al. | 370/60 |

Primary Examiner—Leo H. Boudreau
Assistant Examiner—Kinfe-Michael Negash
Attorney, Agent, or Firm—Kenyon & Kenyon

[57] ABSTRACT

An optical routing system where a time-division multiplexing signal train passes through a front stage semiconductor laser amplifier and detects information of a header and is multiplexed with a local oscillator light from a variable wavelength light source and passes through a rear stage semiconductor laser amplifier, and then is demultiplexed by an optical wavelength division demultiplexer and is outputted to an output side optical signal transmission fiber and an intermediate output port. Wavelength of the local oscillator light and selective wavelength of the optical wavelength division demultiplexer are selected so that a packet is outputted to an assigned intermediate output port. Thereby for the time-division multiplexing optical signal train, while the optical signal train as a whole is held, a specified part or a packet can be distributed.

10 Claims, 3 Drawing Sheets

OPTICAL ROUTING SYSTEM

BACKGROUND OF THE INVENTION

The present invention relates to a time-division multiplexing optical signal transmission network and its switching node according to line switching system, packet switching system, ATM switching system or the like.

Regarding an apparatus having optical distribution function in the prior art, as discussed in the spring symposium in 1990, C-220 of the electronics, information and communication engineers of Japan, a no-load 1×4 optical gate switch constituted by five laser diode optical gate submodules and a 1×4 optical branch waveguide circuit is reported. Switching laser diode optical gate submodules are connected respectively to four output ends of the optical branch waveguide circuit, and one submodule for polarization compensation is connected to input end so that it has an activation layer surface vertical to other four gates. The submodule has structure that an optical gate of InGaAsP laser diode for 1.3 μm band and a single mode top-bulb optical fiber with top end radius 10 μm installed on both ends of the optical disk are enclosed within a Cu-W cabinet, and coupling loss between the laser diode gate and the top-bulb optical fiber is 3 dB. The optical branch waveguide circuit is constituted by a quartz optical waveguide/Si and has 1×2 branch two-stage structure, and transmission loss between the fiber optical branch waveguide circuit and the fiber is 8 dB. Size of the whole switch is 12 mm×75 mm. Exciting current of 27-30 mA is applied to each laser diode optical gate thereby no-loss switching is realized.

Since an optical gate switch of 1×(n-th power of 2) according to the same principle as that of the above-mentioned no-load 1×4 optical gate switch can be compensated in loss between input/output during switching by gain possessed by the contained laser diode optical gate, its application as distribution node in line switching system or a time-division multiplexing optical signal transmission network is being considered. In the above-mentioned no-load 1×4 optical gate switch, however, in addition to the deterioration quantity of S/N ratio (signal to noise strength ratio) in input/output side by the laser diode optical gate submodules before and after the optical branch waveguide circuit, it is further deteriorated by 8 dB due to the optical branch waveguide circuit. In general, in an optical gate switch of 1×(n-th power of 2), a problem exists in that the S/N ratio at the input/output side is deteriorated by (3×N) dB or more in principle due to the optical branch waveguide circuit. Five laser diode optical gate submodules are used in the no-load 1×4 optical gate switch, but laser diode optical gates of (n-th power of 2) pieces or more are necessary in the 1× (n-th power of 2) optical gate switch and a problem exists also in that an optical gate switch of small size and large scale cannot be easily realized. Further considering application as distribution node in the time-division multiplexing optical signal transmission network by packet switching system, ATM switching system or the like, in the optical gate switch of 1× (n-th power of 2), since a specific packet cannot be distributed while optical signal train as a whole is held, if this is connected in cascade, one packet cannot be distributed from the distribution nodes of two positions or more, or similar problem exists in that the use state is limited.

SUMMARY OF THE INVENTION

An object of the present invention is to provide a method which can distribute a specified packet where deterioration of the S/N ratio in the input/output side is little even if the distribution number is increased, or a number of optical active elements are not required and while optical signal train as a whole is preserved, in an optical routing system capable of being applied as distribution node in a time-division multiplexing optical signal transmission node by line switching system, a packet switching system, ATM switching system or the like.

In order to attain the foregoing object, in the present invention, time-division multiplexing optical signal train is multiplexed with single or plural local oscillator lights and then incident to a semiconductor laser amplifier, and lights emitted from the semiconductor laser amplifier are incident to an optical wavelength division demultiplexer. The demultiplexer is designed so that lights having the same wavelength as that of the optical signal train are emitted to an optical signal transmission fiber at the output side, and lights having single or plural wavelengths being different from that of the optical signal train are emitted to single or plural intermediate output ports in one-to-one correspondence with the wavelength. Wavelength of single or plural local oscillator lights is selected to wavelength in one-to-one correspondence with an intermediate output port to be outputted as above described, thereby the optical signal train as a whole can be distributed to an optical signal transmission fiber at output side and an arbitrary part can be distributed to assigned single or plural output ports.

Particularly for a time-division multiplexing optical signal train by packet switching system, ATM switching system or the like, a part of optical signals within each packet is branched by an optical branching device and information regarding a destination of the packet stored in the header is read by the light receiver. Or two semiconductor laser amplifiers are used and each packet passes through the semiconductor laser amplifier at the front stage thereby the information is read. According to the information, the local oscillator lights are emitted by the time while each packet passes. After passing through the optical power splitter or the semiconductor laser amplifier at the front stage, each packet passes through a delay line and then is multiplexed with the local oscillator lights. Here, length of the delay line is determined so that the time required to pass through the delay line is equal to the time of the header from being incident to the light receiver or the semiconductor laser amplifier at the front stage until operating the local oscillator lights. Thereby the optical signal train as a whole can be distributed in the optical signal transmission fiber at the output side and an arbitrary packet can be distributed to single or plural intermediate output ports assigned by the header.

Time-division multiplexing optical signals being incident to the semiconductor laser amplifier modulate the carrier density in the semiconductor laser amplifier. That is, when strength of the optical signal is large, consumption of the carrier is large and the carrier density is decreased. On the other hand, when strength of the optical signal is small, consumption of the carrier is small and decrease of the carrier density is little. Gain received by single or plural local oscillator lights being incident together with the optical signals within the semiconductor laser amplifier becomes high when the carrier density is large, and it becomes low or is transferred to loss when the carrier density is small. Therefore the local oscillator lights are subjected to strength modulation into inverted state of the optical signals. When the optical signals and the local oscillator lights are incident to the optical wavelength division demultiplexer, due to the demultiplexer, the optical signals are emitted to the optical signal transmission fiber at the output side, and the single or plural local oscillator lights having wavelength different from that of the optical signal train are emitted to single or plural intermediate output ports in one-to-one correspondence with the wavelength. Thereby the optical signal train as a whole is distributed to the optical signal transmission fiber at the output side, and an arbitrary part is distributed to assigned single or plural intermediate output ports.

Particularly for a time-division multiplexing optical signal train by packet switching system, ATM switching system or the like, information regarding a destination of the packet stored in the header of each packet can be read by the light receiver. Also when two semiconductor laser amplifiers are used, when the header of each packet passes through the semiconductor laser amplifier at the front stage, since the terminal voltage is modulated, information regarding a destination of each packet can be read from the modulation signal. According to the information, the local oscillator lights are emitted by the time while each packet passes. After passing through the delay line, each packet is incident to the optical wavelength division multiplexer simultaneously with the local oscillator lights and is multiplexed. After passing through the semiconductor laser amplifier, the local oscillator lights subjected to the strength modulation into the inverted state and the optical signals are incident to an optical wavelength division demultiplexer, and by the demultiplexer, the optical signal train as a whole is distributed to the optical signal transmission fiber at the output side, and an arbitrary packet is distributed to single or plural intermediate output parts assigned by the header.

DESCRIPTION OF THE PREFERRED EMBODIMENTS

Figure 1:
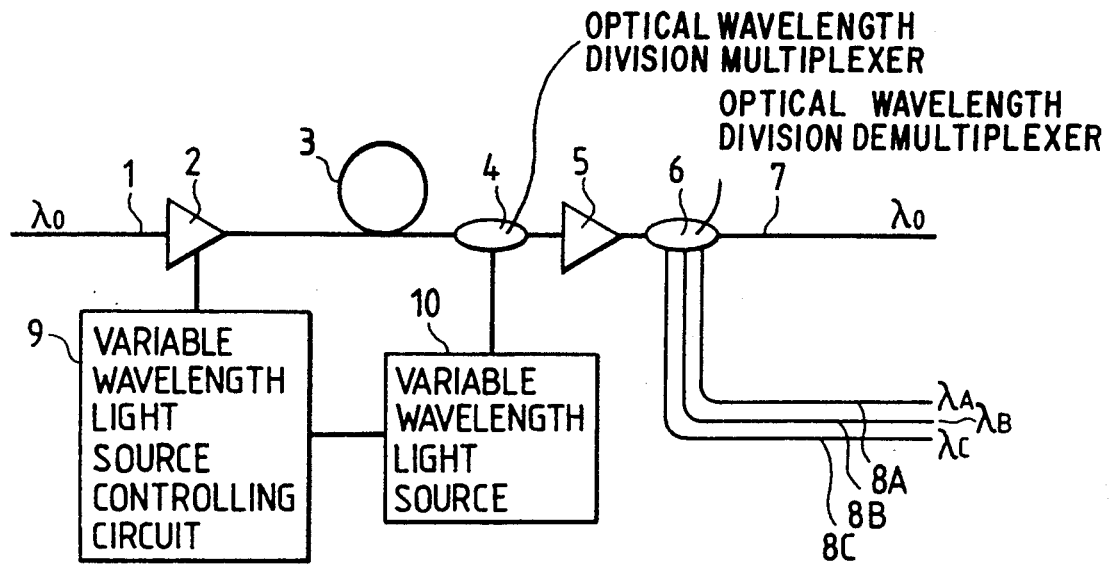
FIG. 1 is a basic constitution diagram of an optical routing system in a first embodiment of the invention.

A first embodiment of the present invention is shown in FIG. 1. FIG. 1 is a constitution diagram of an optical routing system, and an inverted signal of an arbitrary packet in a time-division multiplexing optical signal train inputted from a transmission path connected to the input side of the optical routing system can be outputted to an intermediate output port corresponding to information written in a header of the packet, and at the same time the optical signal train as a whole can be outputted to a transmission path connected to the output side. In FIG. 1, numeral 1 designates an input side optical signal transmission fiber, numeral 2 designates a front stage semiconductor laser amplifier, numeral 3 designates a delay line, numeral 4 designates an optical wavelength division multiplexer, numeral 5 designates a rear stage semiconductor laser amplifier, numeral 6 designates an optical wavelength division demultiplexer, numeral 7 designates an output side optical signal transmission fiber, numerals 8A, 8B, 8C designate intermediate output ports, numeral 9 designates a variable wavelength light source controlling circuit, and numeral 10 designates a variable wavelength light source. Original optical signal train of wavelength $\lambda_0$ in time-division multiplexing of a number of packets is inputted from the input side optical signal transmission fiber 1. Passing through the front stage semiconductor laser amplifier 2 to which definite voltage is applied in the forward direction, the terminal voltage is modulated by the original optical signal train. The modulated signal is transmitted to the variable wavelength light source controlling circuit 9. In the header of each packet is stored information relating to a destination of the packet, that is, information determining either to which of the intermediate output ports 8A, 8B, 8C should be outputted the packet, or to any of the intermediate output ports 8A, 8B, 8C should not be outputted the packet. According to the information, the variable wavelength light source controlling circuit 9 operates the variable wavelength light source 10, and local oscillator lights of definite output are emitted at wavelength in one-to-one correspondence with the destination of the packet. Wavelength of the local oscillator lights shall be $\lambda_A$, $\lambda_B$, $\lambda_C$ when the destination of the packet is the intermediate output ports 8A, 8B, 8C. However, if the packet is not outputted to any of the ports 8A, 8B, 8C, no local oscillator light will be emitted. Definite time delay is generated from the header passes through the front stage semiconductor laser amplifier 2 until the variable wavelength light source 10 emits the local oscillation lights, but length of the delay line 3 is determined precisely-so that the original optical signal passing through the front stage semiconductor laser amplifier 2 spends the same time to pass through the delay line 3. Therefore the header passing through the delay line 3 and the local oscillator light are simultaneously incident to the optical wavelength division multiplexer 4 and multiplexed, and then incident to the rear stage semiconductor laser amplifier 5 to which definite voltage is applied in the forward direction. Carrier density in the rear stage semiconductor laser amplifier 5 is modulated by the original optical signal within the packet, and the local oscillator light is modulated into its inverted signal. The original optical signal and the modulated local oscillator light are emitted from the rear stage semiconductor laser amplifier 5 and then incident to the optical wavelength division demultiplexer 6. The optical wavelength division demultiplexer 6 is designed so as to emit lights of wavelength $\lambda_0$ to the output side optical signal transmission fiber 7 and lights of wavelength $\lambda_A$, $\lambda_B$, $\lambda_C$ to the intermediate output ports 8A, 8B, 8C. Therefore the original optical signal within the packet is outputted to the output side optical signal transmission fiber 7, and its inverted signal is either outputted to any of the intermediate output ports 8A, 8B, 8C in response to the destination written in the header or not outputted to any of the ports 8A, 8B, 8C.

The front stage semiconductor laser amplifier 2 and the rear state semiconductor laser amplifier 5 have the inner gain 28 dB, when the exciting current is 150 mA, and the optical coupling degree at the input/output side is −3.5 dB and the gain between fibers is 21 dB. In the variable wavelength light source controlling circuit 9, a variable wavelength distribution Bragg reflection type laser module having three electrodes is applied. The fiber light output is set to −16 dBm, and the variable width of wavelength is from 1509 nm to 1512.5 nm, i.e., 3.5 nm or more. The variable wavelength light source controlling circuit 9 is designed so that the variable wavelength light source 10 is oscillated with definite output by 176.7 ns in wavelength 1511, 1512, 1513 nm for three sorts of input signals 0001, 0010, 0011. The optical wavelength division demultiplexer 6 is constituted by combination of three pieces of 1:1 optical WDM couplers by a Mach-Zehnder interferometer. A first coupler has an input port I1 and output ports O1, O2. The demultiplexing interval is 1 nm, and selective interval of the output port O1 is 1510, 1512, 1514 . . . 1550, 1552 . . . nm, and selective wavelength of the output port O2 is 1511, 1513, 1515 . . . nm. A second coupler has an input port I2 and output ports O3, O4. The demultiplexing interval is 2 nm, and selective wavelength of the output port O3 is 1512, 1516 . . . nm, and selective wavelength of the output port O4 is 1510, 1514 . . . nm. A third coupler has an input port I3 and output ports O5, O6. The demultiplexing interval is 2 nm, and selective wavelength of the output port O5 is 1513, 1515 . . . nm, and selective wavelength of the output port O6 is 1511, 1515 . . . nm. Any of the 1:1 optical WDM couplers has insertion loss of selective wavelength being −1 dB and crosstalk being −20 dB. The output ports O1, O2 are connected to the input ports I2, I3 thereby the optical wavelength division demultiplexer 6 is constituted. If the optical signals of wavelength 1511, 1512, 1513, 1550 nm are incident to the input port I1, the optical signals of wavelength 1511, 1512, 1513, 1550 nm are outputted from the output ports O6, O3, O5, O4. Insertion loss of selective wavelength of the optical wavelength division demultiplexer 6 is −3 dB, and the crosstalk is −16 dB. The output ports O6, O3, O5 and O4 are connected to the intermediate output ports 8A, 8B, 8C and the output side optical signal transmission fiber 7. In the optical wavelength division multiplexer 4, a non-polarization beam splitter is used.

Packet multiplexing optical signal train with wavelength $\lambda_0$ being 1.55 μm and optical output level in peak value being −20 dB is inputted to the optical routing system. Optical signals within the packet are NRZ modulation signals with the transmission speed 2.4 Gb/s and the mark ratio ½. Each packet has a header of 5 bytes and an information part of 48 bytes. To the header of each packet are allocated control signals of 0001, 0010, 0011, 0000 in this order repeatedly. If the control signals of the header are 0001, 0010, 0011, inverted signals of the optical signals within each packet are obtained to the intermediate output ports 8A, 8B, 8C, and at the same time the optical signals within each packet are outputted to the output side optical signal transmission fiber 7. Optical output level in the peak value of each inverted signal is 0 dBm, and "1", "0" level ratio is −15 dB or more. Optical output level in the peak value of the optical signal transmission fiber 7 is 3 dBm. If the control signal of the header is 0000, only the optical signal within each packet is outputted to the output side optical signal transmission fiber 7, and the optical output level in the peak value is 3 dBm.

Figure 2:
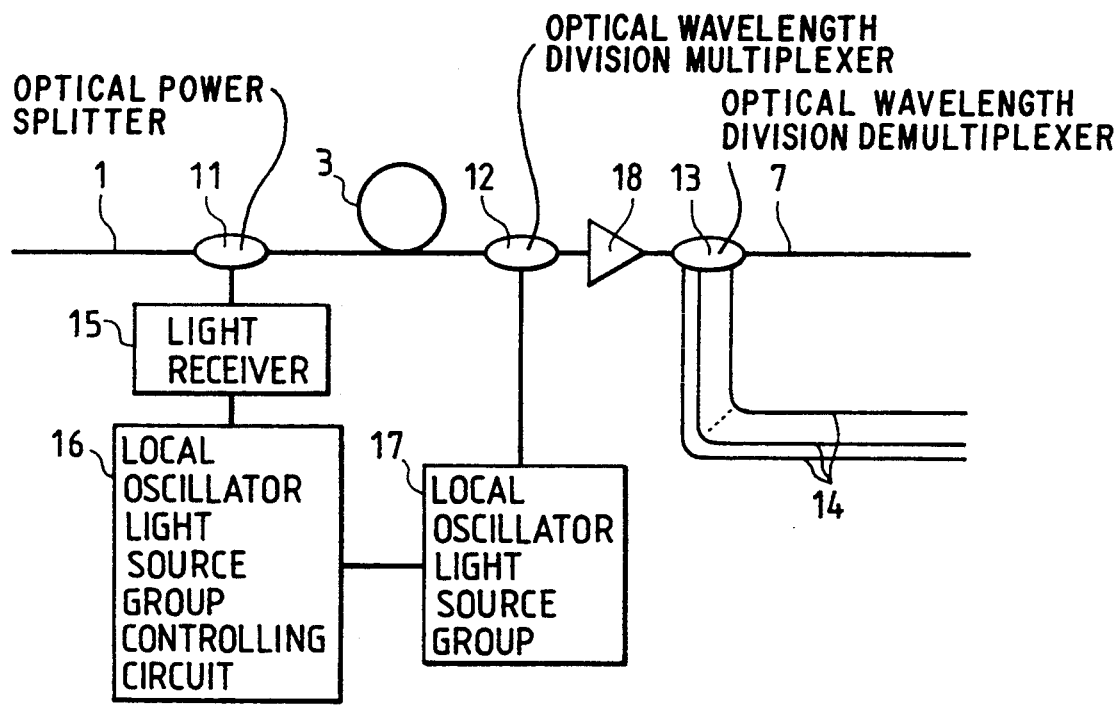
FIG. 2 is a basic constitution diagram of an optical routing system in a second embodiment of the invention.

A second embodiment of the present invention is shown in FIG. 2. FIG. 2 is a constitution diagram of an optical routing system, and inverted signals of an arbitrary packet in a time-division multiplexing optical signal train inputted from a transmission path connected to the input side of the optical routing system can be outputted to intermediate output ports of 0, 1, 2, 3 or 4 pieces corresponding to information written in a header of the packet, and at the same time the optical signal train as a whole can be outputted to a transmission path connected to the output side. In FIG. 2, numeral 11 designates an optical power splitter, numeral 12 designates an optical wavelength division multiplexer, numeral 13 designates an optical wavelength division demultiplexer, numeral 14 designates an intermediate output port, numeral 15 designates a light receiver, numeral 16 designates a local oscillator light source group, and numeral 18 designates a semiconductor laser amplifier. There are 16 pieces of the intermediate output ports, and the local oscillator light source group 17 is constituted by 16 pieces of local oscillator light sources and wavelength of a light emitted from each local oscillator light source is in one-to-one correspondence with each intermediate output port. In similar manner to the first embodiment, an original optical signal train of wavelength $\lambda_0$ with a number of packets in time-division multiplexing is inputted from the input side optical signal transmission fiber 1. A part is branched by the optical power splitter 11 and received by the light receiver 15. The received signal is transmitted to the local oscillator light source group controlling circuit 16. In the header of each packet is stored information relating to a destination of the packet, that is, information determining either to which of the intermediate output ports 14 should be outputted the packet, or to any of the intermediate ports 14 should not be outputted the packet. According to the information, the local oscillation light source group controlling circuit 16 operates one or plural local oscillator light sources among the local oscillator light source group 17, and local oscillator lights are emitted. However, when the destination of the packet is the i-th (i is integer of 1-16) intermediate output port, the local oscillator light source having wavelength $\lambda_i$ is operated and the local oscillator light is emitted. If the packet is not outputted to any of the ports, no local oscillator light is emitted. After the packet passes through the delay line 3, the header and each local oscillator light are incident simultaneously to the optical wavelength division multilexer 12 and multiplexed, and then incident to the semiconductor laser amplifier 18 to which definite voltage is applied in the forward direction. In similar manner to the first embodiment, length of the delay line 3 is determined precisely so that the time delay from the header being branched by the optical power splitter 11 until the local oscillator light source group 17 emitting the local oscillator light can be compensated. The carrier density in the semiconductor laser amplifier 18 is modulated by the original optical signals within the packet, and each local oscillator light is modulated to the inverted signal. The original optical signal and each modulated local oscillator light are emitted from the semiconductor laser amplifier 18, and then incident to the optical wavelength division demultiplexer 13. The optical wavelength division demultiplexer 13 is designed so that light with wavelength 20 is emitted to the output side optical signal transmission fiber 7 and light with wavelength $\lambda_i$ is emitted to the i-th intermediate output port 14. Therefore the original optical signal within the packet is outputted to the output side optical signal transmission fiber 7, and the inverted signal is outputted to the intermediate output ports 14 of 0, 1, 2, 3 or 4 pieces in response to the destination written in the header.

The semiconductor laser amplifier 18 has the inner gain 28 dB, when the exciting current is 150 mA, and the optical coupling degree at the input/output side is −3.5 dB and the gain between fibers is 21 dB. The local oscillator light source 17 is constituted by 16 pieces of semiconductor laser modules where the oscillation wavelength is set in interval of 1 nm from 1523 nm to 1538 nm. The fiber light output is set to each −16 dBm. The local oscillator light source 16 is designed so that the selected local oscillator light source 17 is oscillated in definite output by 176.7 ns, for the input signals 000000000000, 000000000001 . . . 100111010101 of sorts corresponding to the number when 0, 1, 2, 3 or 4 pieces are selected from 16 pieces of the intermediate output ports 14, i.e., $_{16}C_0 + _{16}C_1 + \ldots + _{16}C_4 = 2517$. The optical wavelength division demultiplexer 13 is constituted in combination of a slab waveguide having converging function with an array waveguide diffraction grating and an input/output waveguide. The array waveguide diffraction grating is constituted by 201 pieces of waveguides where optical path length difference between the neighboring waveguides is 37.14 μm. It has one input port and 28 output ports, and selective wavelength of each output port is distributed in interval of 1 nm from 1523 nm to 1550 nm. Insertion loss of the selective wavelength of each output port is −5-7 dB and the crosstalk is −15 dB. Each output port with selective wavelength from 1523 nm to 1538 nm is connected to the first to sixteenth intermediate output ports 14 in one-to-one correspondence, and the output port with selective wavelength being 1550 nm is connected to the output side optical signal transmission fiber 7. The optical wavelength division multiplexer 12 is constituted by that same as the optical wavelength division demultiplexer 13 in changing between the input side and the output side. Each input port filth selective wavelength from 1523 nm to 1538 nm is connected in one-to-one correspondence to 16 pieces of the semiconductor laser modules with oscillation wavelength from 1523 nm to 1538 nm among the local oscillator light source group 17, and the input port with selective wavelength being 1550 nm is connected-to the output side fiber of the semiconductor laser amplifier 18.

The packet multiplexing optical signal train with the wavelength $\lambda_0$ being 1.55 μm and the light output level in the peak value being 8 dB is inputted to the optical routing system. The optical signals within the packet are NRZ modulation signals with the transmission speed being 2.4 Gb/s and the mark ratio being ½. Each packet has a header of 5 bytes and an information port of 48 bytes. The control signals of 000000000000, 000000000001 . . . 100111010101 of 2517 sorts selecting 0, 1, 2, 3 or 4 pieces among 16 pieces of the intermediate output ports 14 are allocated in this order repeatedly to the header of each packet. In response to the control signal of the header, an inverted signal of an optical signal within each packet is obtained, and at the same time, the optical signal within each packet is outputted to the output side optical signal transmission fiber 7. The light output level in the peak value of each inverted signal is −9−−10 dBm, and the "1", "0" level ratio is −15 dB or more. The light output level in the peak value of the optical signal outputted to the output side optical signal transmission fiber 7 is −1 dBm.

Figure 3:
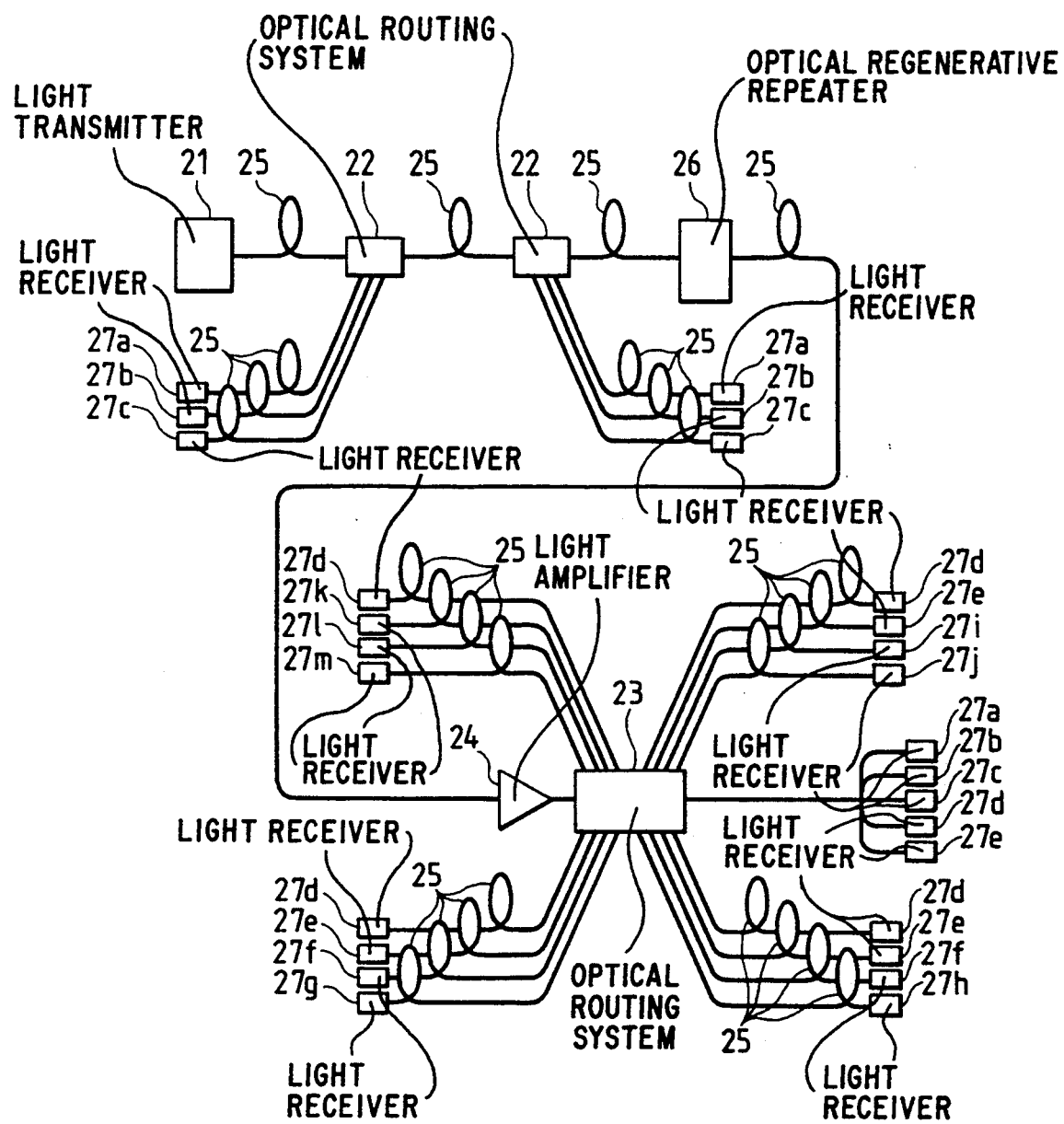
FIG. 3 is a diagram of a time-division multiplexing optical transmission network using the optical routing system in the first and second embodiments.

An embodiment of a time-division multiplexing optical transmission network using the optical routing system of the first and second embodiments is shown in FIG. 3. In FIG. 3, numeral 21 designates a light transmitter, numeral 22 designates an optical routing system in the first embodiment, numeral 23 designates an optical routing system in the second embodiment, numeral 24 designates a light amplifier, numeral 25 designates a single mode optical fiber for transmission, numeral 26 designates an optical regenerative repeater, and numerals 27a–27m designate light receivers. The light transmitter 21 can transmit a packet multiplexing optical signal train of wavelength 1550 nm constituted by NRZ modulation signals having transmission speed 2.4 Gb/s, wavelength 1550 nm and mark ratio ½. The fiber light output is set in mean light output level being −3 dBm. The single mode optical fiber 25 for transmission is a zero-dispersion shift fiber of 1550 mn band, and the transmission loss is 0.2 dB/km. The light amplifier 24 is a fiber light amplifier which carries out light amplification by an erbium added optical fiber subjected to bidirectional optical excitation by a semiconductor laser of wavelength 1480 nm. Each exciting input to the fiber of the semiconductor laser is 34 mW, and the maximum gain is 33 dB and the compression output of the 3 dB gain is 12 dBm. Each of the light receivers 27a–27m is constituted by a preamplifier IC containing InGaAs-APD module, an equalization amplifier circuit, a timing extraction circuit, a discrimination reproducing circuit, and the maximum light receiving power is −32 dBm in the error ratio $10^{-11}$. The optical regenerative repeater 26 is constituted in combination of the light receiver 27 and the light transmitter 24, and has 3R functions, that is, functions of equalization amplifying, retiming and discrimination reproducing. The minimum light receiving power is −32 dBm in the error ratio $10^{-11}$, and the mean light output level is −3 dBm. In order to transmit different signals to the light receivers 27a–27m, 13 sorts of the packets A–M in this order are subjected to time-division multiplexing repeatedly. Each packet has a header of 5 bytes and an information part of 48 bytes. Control signals of 0001, 0010 . . . 1101 are allocated as a destination of the packet to the header of each of the packets A–M. The optical routing system 22 in the first embodiment is set so that the control signals of the header output the packets of 0001, 0010, 0011 to each intermediate output port to which the light receivers 27a, 27b, 27c are connected. The optical routing system 23 in the second embodiment is set so that the control signals of the header output the packets of 0001, 0101 . . . 1101 to the intermediate output ports of 1–4 pieces to which the light receivers 27d, 27e . . . 27m are connected. Length of the single mode optical fiber 25 for transmission shall be made 100 km between the light transmitter 21 and the optical routing system 22 in the first embodiment, 115 km between the optical routing system 22 in the first embodiment, 100 km between the optical routing system 22 in the first embodiment and the optical regenerative repeater 26, 125 km between the optical regenerative repeater 26 and the light amplifier 24, 100 km between the optical routing system 23 in the second embodiment and the light receivers 27a, 27b . . . 27e, 80 km between the optical routing system 22 in the first embodiment and the light receivers 27a, 27b . . . 27e, and 50 km between the optical routing system 23 in the second embodiment and the light receivers 27d, 27e ... 27m. As a result of transmitting the packet multiplexing optical signal train from the light transmitter 21, optical signals within the packets A–M are received in a number of light receivers 27a–27m respectively, and clear eye patterns are obtained.

Figure 4:
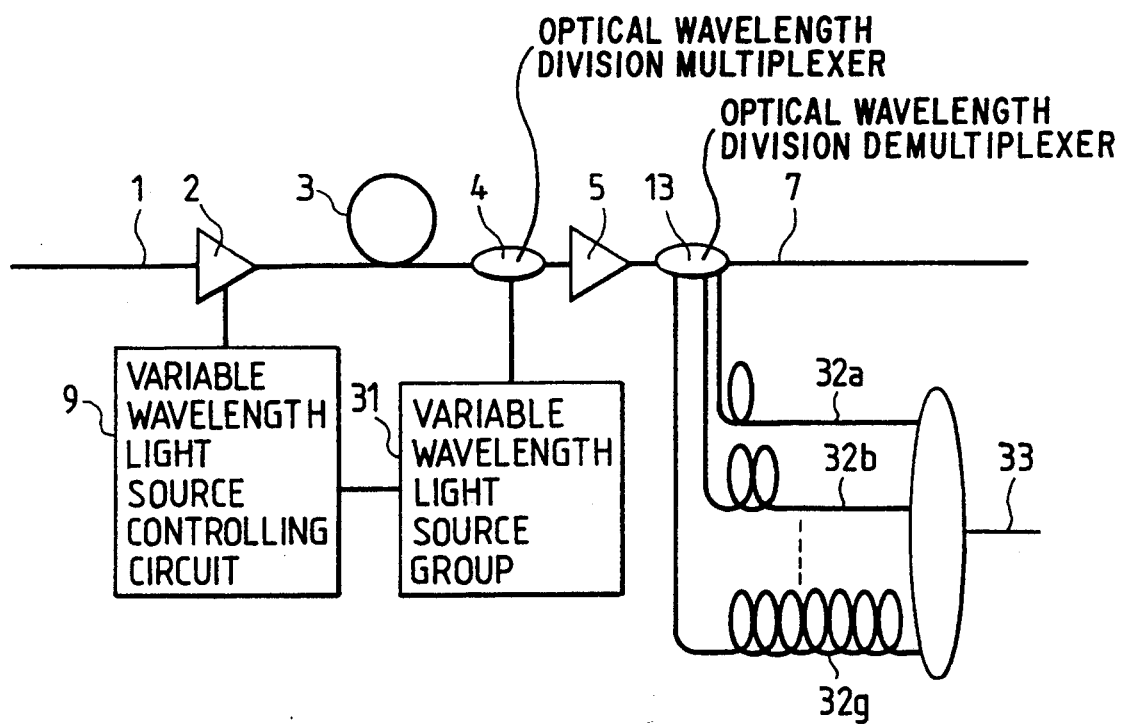
FIG. 4 is a constitution diagram of a packet switching apparatus.

A fourth embodiment of the present invention is shown in FIG. 4. FIG. 4 is a constitution diagram of a packet switching apparatus. An arbitrary packet in a time-division multiplexing optical signal train inputted from a transmission path connected to the input side of the packet switching apparatus is stored again in an arbitrary time slot, on the premise that two or more packets are not stored in one time slot, and then the stored packet is outputted from an intermediate output port and the optical signal train itself can be outputted to a transmission path connected to the output side. In FIG. 4, numeral 31 designates a variable wavelength light source group, numerals 32a–32g designate delay lines, and numeral 33 designates an intermediate output port. A time-division multiplexing optical signal has wavelength $\lambda_0$ and four time slots, and a packet is stored in each time slot. The optical signal train is inputted from an input side optical signal transmission fiber 1. Passing through a front stage semiconductor laser amplifier 2 to which definite voltage is applied in the forward direction, the terminal voltage is modulated by the original optical signal train. The modulated signal is transmitted to a variable wavelength light source controlling circuit 9. In a header of each packet is stored information regarding to what number of a time slot is stored the packet at present and next to what number of a time slot should be stored again the packet. According to the information, the variable wavelength light source controlling circuit 9 operates the variable wavelength light source group 31, and local oscillator lights of definite output are emitted in wavelength in one-to-one correspondence with moving amount of a time slot in which the packet is to be stored. Wavelength of the local oscillator lights shall be $\lambda_1, \lambda_2 ... \lambda_7$ if the moving amount corresponds to the time slots of 1, 2 ... 7 pieces. After the packet passes through the delay line 3, the header and the local oscillator light are incident to an optical wavelength division multiplexer 4 simultaneously and multiplexed, and then incident to a rear stage semiconductor laser amplifier 5 to which definite voltage is applied in the forward direction. In similar manner to the first embodiment, length of the delay line 3 is determined precisely so that the time delay from the header passing through the front stage semiconductor laser amplifier 2 until the variable wavelength light source group 31 emitting the local oscillator light can be compensated. Carrier density in the rear stage semiconductor laser amplifier 5 is modulated by the original optical signal within the packet, and the local oscillator light is modulated to the inverted signal. The original optical signal and the modulated local oscillator light are emitted from the rear stage semiconductor laser amplifier 5 and then incident to the optical wavelength division demultiplexer 13. The optical wavelength division demultiplexer 13 is designed so that light with wavelength $\lambda_0$ is emitted to the output side optical signal transmission fiber 7 and lights with wavelength $\lambda_1, \lambda_2 ... \lambda_7$ are emitted to the delay lines 32a, 32b ... 32g. Length of each of the delay lines 32a, 32b ... 32g is determined precisely so that time corresponding to each of the time slots of 1, 2 ... 7 pieces is required for the optical signal train to pass through the delay lines 32a, 32b ... 32g. The delay lines 32a, 32b ... 32g are multiplexed by the optical wavelength division multiplexer 12 and outputted to the intermediate output port 33. According to the above-mentioned constitution, an optical signal train with an arbitrary time slot can be obtained from the intermediate output port 33.

The variable wavelength light source group 31 is constituted using two variable wavelength distribution Bragg reflection type laser modules each having three electrodes, and each wavelength variable width is 1523–1526 nm and 1527–1529 nm and by changing both, wavelength of 1523–1529 nm can be selected. The fiber light output is $-16$ dBm. The variable wavelength light source controlling circuit 9 is designed so that when the packet is stored in the i-th time slot at present and should be stored again in the j-th time slot next and j - i is $-3, -2, -1, 0, 1, 2, 3$, the variable wavelength light source group 31 is oscillated at definite output by 176.7 ns in wavelength 1523, 1524, 1525, 1526, 1527, 1528, 1529 nm. Among output ports of the optical wavelength division demultiplexer, each output port with selective wavelength from 1523 nm to 1529 nm is connected to the delay lines 32a, 32b ... 32g, and an output port with selective wavelength 1550 nm is connected to the output side optical signal transmission fiber 7.

A packet multiplexing optical signal train with wavelength $\lambda_0$ being 1.55 μm and light output level in the peak value being $-20$ dBm is inputted in the optical routing system. The optical signal train has four time slots, and a packet is stored in each time slot. An optical signal within the packet is NRZ modulation signal with transmission speed being 2.4 Gb/s and mark ratio being ½. Each packet has a header of 5 bytes and an information part of 48 bytes. The number of the time slot storing the packet at present is allocated to the first byte of the header of each packet, and the number of the time slot to store the packet next is allocated to the second byte. In order that the packets in the first, second, third and fourth time slots are stored again in the fourth, second, third and first time slots, each of the control signals of 00010100, 00100010, 00110011, 01000001 is allocated. Inverted signals with packets in the first, second, third and fourth time slots among the packet multiplexing optical signal train being stored again in the fourth, second, third and first time slots are obtained from the intermediate output port 33, and at the same time the inputted packet multiplexing optical signal train is outputted to the output side optical signal transmission fiber 7. The light output level in the peak value of each inverted signal is $-15$ dB or more. The light output level in the peak value of the optical signal outputted to the output side optical signal transmission fiber 7 is $-1$ dBm.

Figure 5:
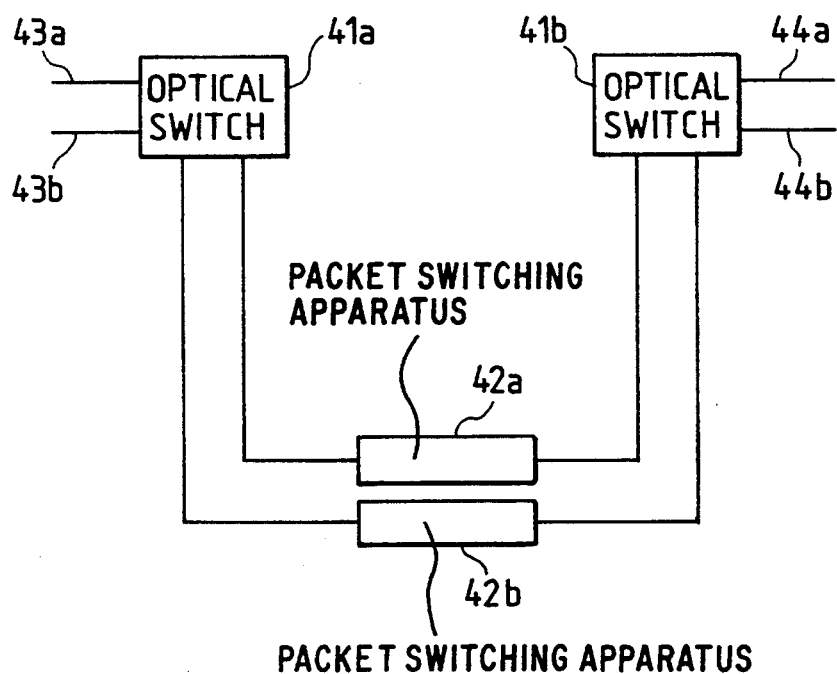
FIG. 5 is a constitution diagram of an embodiment of an optical switch.

An embodiment of an optical switch using the packet switching apparatus in the fourth embodiment is shown in FIG. 5. In FIG. 5, numerals 41a–41b designate optical switches, numerals 42a, 42b designate packet switching apparatuses in the fourth embodiment, numerals 43a, 43b designate input side optical signal transmission fibers, and numerals 44a, 44b designate output side optical signal transmission fibers. A packet multiplexing optical signal train to be inputted or outputted has four time slots, and a packet is stored in each time slot. In a packet multiplexing optical signal train inputted from the input side optical signal transmission fiber 43a, by the optical 41a, packets in the first and third time slots are inputted to the packet switching apparatus 42a of the fourth embodiment, and packets in the second and fourth time slots are inputted to the packet switching apparatus 42b of the fourth embodiment. In a packet multiplexing optical signal transmission fiber 43b, by the optical switch 41a, packets in the first and third time slots are inputted to the packet switching apparatus 42b of the fourth embodiment, and packets in the second and fourth time slots are inputted to the packet switching apparatus 42a of the fourth embodiment. In the packet switching apparatuses 42a, 42b of the fourth embodiment, inverted signals within each slot are stored again in the assigned time slot. In the inverted signal outputted from the intermediate output of the packet switching apparatus 42a of the fourth embodiment, by the optical switch 41b, packets in the first and third time slots are outputted to the output side optical fiber 44a, and packets in the second and fourth time slots are outputted to the output side transmission fiber 44b. In the inverted signal outputted from the intermediate output port of the packet switching apparatus 42b of the fourth embodiment, by the optical switch 41b, packets in the first and third time slots are outputted to the output side optical signal transmission fiber 44b, and packets in the second and fourth time slots are outputted to the output side optical signal transmission fiber 44a.

The optical switches 41a, 41b are LiNbO$_3$ 2×2 optical switches, and insertion loss between input/output ports is 1-2 dB and extinction ratio is 20-25 dB. A packet multiplexing optical signal train with wavelength $\lambda_0$ being 1.55 μm and light output level in the peak value being −18 dBm is inputted to the input side optical signal transmission fibers 43a, 43b of the optical switch. The optical signal train has four time slots, and a packet is stored in each time slot optical signals within the packet are NRZ modulation signals of transmission speed 2.4 Gb/s and mark ratio ½. Each packet has a header of 5 bytes and an information part of 48 bytes. The number of the time slot storing the packet at present is allocated to the first byte of the header of each packet, and the number of the time slot to store the packet next is allocated to the second byte. Study has been carried out in the case that among packets inputted from the input side optical signal transmission fiber 43a, packets in the first and fourth time slots are outputted to the output side optical signal transmission fiber 44b, and other packets are outputted to the output side optical signal transmission fiber 44a, and that among packets inputted from the input side optical signal transmission fiber 43b, packets in the first and fourth time slots are outputted to the output side optical signal transmission fiber 44a, and other packets are outputted to the output side optical signal transmission fiber 44b. Each of the control signals 00010100, 00100010, 00110011, 01000001 is allocated to header of packets in the first, second, third and fourth time slots inputted from the input side optical signal transmission fibers 43a, 43b. Packets in the first, second, third and fourth time slots inputted to the packet switching apparatuses 42a, 42b of the fourth embodiment are together stored again in the fourth, second, third and first time slots. Inverted signals within packets in the first and fourth time slots inputted from the input side optical signal transmission fiber 43a and within packets in the second and third time slots inputted from the input side optical signal transmission fiber 43b are outputted to the output side optical signal transmission fiber 44b, and inverted signals within packets in the second and third time slots inputted from the input side optical signal transmission fiber 43a and within packets in the first and fourth time slots inputted from the input side optical signal transmission fiber 43b are outputted to the output side optical signal transmission fiber 44a. Light output level in the peak value of each inverted signal is −12−−13 dBm, and the "1", "0" level ratio is 15 dB or more.

According to the present invention, in an optical routing system to be applied as distribution node in a time-division multiplexing optical signal transmission network according to line switching system, ATM switching system or the like, even if the distribution number is increased, deterioration of S/N ratio at input-/output side is little or a number of optical active elements are not required and while an optical signal train as a whole is preserved a specified part or a packet can be distributed, thereby a time-division multiplexing optical transmission network according to line switching system of large scale and high speed or packet switching system, ATM switching system or the like can be constituted by relatively free layout and low cost, and application to optical communication network in subscriber system or repeating system or optical local area network becomes possible.

What is claimed is:

1. An optical routing system installed on a transmission path of a time-division multiplexing optical signal train, comprising:
    a variable wavelength light source emitting a local oscillator light in correspondence with the time-division multiplexing optical signal train;
    an optical wavelength division multiplexer multiplexing the local oscillator light with the time-division multiplexing optical signal train;
    a semiconductor optical amplifier coupled to the optical wavelength division multiplexer, modulating the multiplexed local oscillator light into an inverted signal; and
    an optical wavelength division demultiplexer coupled to the semiconductor optical amplifier, demultiplexing the inverted signal from the time-division multiplexing optical signal train.

2. An optical routing system according to claim 1, further comprising:
    a front stage semiconductor laser amplifier coupled to the variable wavelength light source in a front stage, passing the time-division multiplexing optical signal train therethrough; and
    a variable wavelength light source controlling circuit controlling the variable wavelength light source based on a terminal voltage of the front stage semiconductor laser.

3. An optical routing system installed on a transmission path of a time-division multiplexing optical signal train, comprising:
    a local oscillator light source group emitting a local oscillator light in correspondence with the time-division multiplexing optical signal train;
    an optical wavelength division multiplexer multiplexing the local oscillator light with the time-division multiplexing optical signal train;
    a semiconductor optical amplifier coupled to the optical wavelength division multiplexer, modulating the multiplexed local oscillator light into an inverted signal; and
    an optical wavelength division demultiplexer coupled to the semiconductor optical amplifier, demultiplexing the inverted signal from the time-division multiplexing optical signal train.

4. An optical routing system according to claim 3, further comprising:
  an optical power splitter coupled to the variable wavelength light source in a front stage, splitting the time-division multiplexing optical signal train; and
  a local oscillator light source group controlling circuit controlling the local oscillator light source group based on the split optical signal train.

5. An optical routing system installed on a transmission path of a time-division multiplexing optical signal train, comprising:
  a local oscillator outputting a local light signal;
  an optical wavelength division multiplexer multiplexing the local light signal with the time-division multiplexing optical signal train;
  a semiconductor optical amplifier coupled to the optical wavelength division multiplexer, modulating the multiplexed local light signal into an inverted signal; and
  an optical wavelength division demultiplexer coupled to the semiconductor optical amplifier, demultiplexing the inverted signal from the time-division multiplexing optical signal train.

6. A time-division multiplexing optical transmission network comprising:
  a light transmitter;
  a first optical routing system coupled to the light transmitter; and
  a second optical routing system coupled to the first optical routing system;
  wherein the first optical routing system comprises:
    a variable wavelength light source emitting a first local oscillator light in correspondence with a time-division multiplexing optical signal train;
    a first optical wavelength division multiplexer multiplexing the first local oscillator light with the time-division multiplexing optical signal train;
    a first semiconductor optical amplifier coupled to the first optical wavelength division multiplexer, modulating the multiplexed first local oscillator light into a first inverted signal; and
    a first optical wavelength division demultiplexer coupled to the first semiconductor optical amplifier, demultiplexing the first inverted signal from the time-division multiplexing optical signal train; and
  wherein the second optical routing system comprises:
    a local oscillator light source group emitting a second local oscillator light in correspondence with the time-division multiplexing optical signal train;
    a second optical wavelength division multiplexer multiplexing the second local oscillator light with the time-division multiplexing optical signal train;
    a second semiconductor optical amplifier coupled to the second optical wavelength division multiplexer, modulating the multiplexed second local oscillator light into a second inverted signal; and
    a second optical wavelength division demultiplexer coupled to the second semiconductor optical amplifier, demultiplexing the second inverted signal from the time-division multiplexing optical signal train.

7. A time-division multiplexing optical transmission network comprising:
  a light transmitter;
  an optical routing system coupled to the light transmitter, comprising a local oscillator outputting a local light signal, an optical wavelength division multiplexer multiplexing the local light signal with a time-division multiplexing optical signal train, a semiconductor optical amplifier coupled to the optical wavelength division multiplexer, modulating the multiplexed local light signal into an inverted signal, and an optical wavelength division demultiplexer coupled to the semiconductor optical amplifier, demultiplexing the inverted signal from the time-division multiplexing optical signal train; and
  a plurality of light receivers coupled to the optical routing system, wherein at least one of the light receivers receives the inverted signal.

8. A packet switching apparatus for switching packets in a time-division multiplexing optical signal train, comprising:
  a variable wavelength light source group emitting a plurality of local oscillator lights in correspondence with the time-division multiplexing optical signal train;
  an optical wavelength division multiplexer multiplexing the local oscillator lights with the time-division multiplexing optical signal train;
  a semiconductor optical amplifier coupled to the optical wavelength division multiplexer, modulating the multiplexed local oscillator lights into a plurality of inverted signals;
  an optical wavelength division demultiplexer coupled to the semiconductor optical amplifier, demultiplexing the inverted signals from the time-division multiplexing optical signal train;
  a plurality of delay lines coupled to the optical wavelength division demultiplexer, delaying the respective inverted signals with different delay times; and
  a multiplexer multiplexing the delayed inverted signals together to obtain an optical signal train with an arbitrary time slot.

9. A packet switching apparatus according to claim 8, further comprising:
  a front stage semiconductor laser amplifier coupled to the variable wavelength light source group in a front stage, passing the time-division multiplexing optical signal train therethrough; and
  a variable wavelength light source controlling circuit controlling the variable wavelength light source group based on a terminal voltage of the front stage semiconductor laser.

10. An optical switch system comprising:
  a first optical switch coupled to a first input side optical signal transmission fiber and a second input side optical signal transmission fiber;
  a second optical switch coupled to a first output side optical signal transmission fiber and a second output side optical signal transmission fiber;
  a first optical switch apparatus coupled between the first and second optical switches; and
  a second optical switch apparatus coupled between the first and second optical switches;
  wherein each of the first and second optical switch apparatuses comprises:
    a variable wavelength light source group emitting a plurality of local oscillator lights in correspondence with the time-division multiplexing optical signal train;

an optical wavelength division multiplexer multiplexing the local oscillator lights with the time-division multiplexing optical signal train;

a semiconductor optical amplifier coupled to the optical wavelength division multiplexer, modulating the multiplexer local oscillator lights into a plurality of inverted signals;

an optical wavelength division demultiplexer coupled to the semiconductor optical amplifier, demultiplexing the inverted signals from the time-division multiplexing optical signal train;

a plurality of delay lines coupled to the optical wavelength division demultiplexer, delaying the respective inverted signals with different delay times; and a multiplexer multiplexing the delayed inverted signals together to obtain an optical signal train with an arbitrary time slot.

* * * * *

UNITED STATES PATENT AND TRADEMARK OFFICE
CERTIFICATE OF CORRECTION

PATENT NO. : 5,438,444
DATED : August 1, 1995
INVENTOR(S) : Takashi Tayonaka, et. al.

It is certified that error appears in the above-identified patent and that said Letters Patent is hereby corrected as shown below:

Columns 1-16 should be deleted and replace with Columns 1-16 as shown on the attaches pages.

Signed and Sealed this

Twenty-sixth Day of March, 1996

BRUCE LEHMAN

*Attest:*

*Attesting Officer*   *Commissioner of Patents and Trademarks*

OPTICAL ROUTING SYSTEM

BACKGROUND OF THE INVENTION

The present invention relates to a time-division multiplexing optical signal transmission network and its switching node according to a line switching system, packet switching system, ATM switching system or the like.

An apparatus having an optical distribution function is discussed in the Spring Symposium in 1990, C-220 of the Electronics, Information and Communication Engineers of Japan. This reference discloses a no-load 1×4 optical gate switch constituted by five laser diode optical gate submodules and a 1×4 optical branch waveguide circuit. Switching laser diode optical gate submodules are respectively connected to four output ends of the optical branch waveguide circuit, and one submodule for polarization compensation is connected to an input end so that it has an activation layer surface vertical to four other gates. The submodule is structured such than an optical gate of an InGaAsP laser diode for 1.3 μm band and a single mode top-bulb optical fiber with top end radius of 10 μm installed on both ends of the optical disk are enclosed within a Cu-W cabinet, and a coupling loss between the laser diode gate and the top-bulb optical fiber is 3 dB. The optical branch waveguide circuit is constituted by a quartz optical waveguide /Si and has 1×2 branch two-stage structure, and transmission loss between the fiber optical branch waveguide circuit and the fiber is 8 dB. The size of the whole switch is 12 mm×75 mm. An exciting current of 27-30 mA is applied to each laser diode optical gate, and no-loss switching is thereby realized.

Since an optical gate switch of $1 \times 2^n$ (n-th power of 2) according to the same principle as that of the above-mentioned no-load 1×4 optical gate switch can be compensated in loss between input/output during switching by gain possessed by the contained laser diode optical gate, its application as distribution node in a line switching system or a time-division multiplexing optical signal transmission network is being considered. In the above-mentioned no-load 1×4 optical gate switch, however, in addition to the deterioration quantity of the S/N ratio (signal to noise strength ratio) in input/output side by the laser diode optical gate submodules before and after the optical branch waveguide circuit, it is further deteriorated by 8 dB due to the optical branch waveguide circuit. In general, in an optical gate switch of $1 \times 2^n$ (n-th power of 2), a problem exists in that the S/N ratio at the input/output side is deteriorated by $(3 \times N)$ dB or more in principle due to the optical branch waveguide circuit. Five laser diode optical gate submodules are used in the no-load 1×4 optical gate switch, but laser diode optical gates of $2^n$ (n-th power of 2) pieces or more are necessary in the $1 \times 2^n$ (n-th power of 2) optical gate switch. A problem also exists in that an optical gate switch of small size and large scale cannot be easily realized. Further considering application as a distribution node in the time-division multiplexing optical signal transmission network by packet switching system, ATM switching system or the like, in the optical gate switch of $1 \times 2^n$ (n-th power of 2), since a specific packet cannot be distributed while optical signal train as a whole is held, if this is connected in cascade, one packet cannot be distributed from the distribution nodes of two positions or more, or a similar problem exists in that the use state is limited.

SUMMARY OF THE INVENTION

The present invention relates to a method which can distribute a specified packet where deterioration of the S/N ratio in the input/output side is little even if the distribution number is increased, or a number of optical active elements are not required and the optical signal train as a whole is preserved, in an optical routing system capable of being applied as a distribution node in a time-division multiplexing optical signal transmission node by a line switching system, a packet switching system, ATM switching system or the like.

In order to attain the foregoing, in the present invention, a time-division multiplexing optical signal train is multiplexed with single or plural local oscillator lights and then incident to a semiconductor laser amplifier, and lights emitted from the semiconductor laser amplifier are incident to an optical wavelength division demultiplexer. The demultiplexer is designed so that lights having the same wavelength as that of the optical signal train are emitted to an optical signal transmission fiber at the output side, and lights having single or plural wavelengths which are different from that of the optical signal train are emitted to single or plural intermediate output ports in a one-to-one correspondence with the wavelength. The wavelength of the single or plural local oscillator lights is selected to be in one-to-one correspondence with an intermediate output port to be output as described above. The optical signal train as a whole can thereby be distributed to an optical signal trammission fiber at an output side and an arbitrary part can be distributed to assigned single or plural output ports.

Particularly for a time-division multiplexing optical signal train by a packet switching system, ATM switching system or the like, a part of the optical signals within each packet is branched by an optical branching device and information regarding a destination of the packet stored in the header is read by the light receiver. Alternatively, two semiconductor laser amplifiers are used and each packet passes through the semiconductor laser amplifier at the front stage to thereby read the information. According to the information, the local oscillator lights are emitted by the time each packet passes. After passing through the optical power splitter or the semiconductor laser amplifier at the front stage, each packet passes through a delay line and then is multiplexed with the local oscillator lights. Here, length of the delay line is determined so that the time required to pass through the delay line is equal to the time of the header from being incident to the light receiver or the semiconductor laser amplifier at the front stage until operating the local oscillator lights. The optical signal train as a whole can thereby be distributed in the optical signal transmission fiber at the output side and an arbitrary packet can be distributed to single or plural intermediate output ports assigned by the header.

Time-division multiplexing optical signals which are incident to the semiconductor laser amplifier modulate the carrier density in the semiconductor laser amplifier. That is, when strength of the optical signal is large, consumption of the carrier is large and the carrier density is decreased. On the other hand, when strength of the optical signal is small, consumption of the carrier is small and decrease of the carrier density is little. Gain received by single or plural local oscillator lights which are incident together with the optical signals within the semiconductor laser amplifier becomes high when the carrier density is large, and it becomes low or is transferred to loss when the carrier density is small. Therefore the local oscillator lights are subjected to strength modulation into an inverted state of the optical signals. When the optical signals and the local oscillator lights are incident to the optical wavelength division demultiplexer, due to the demultiplexer, the optical signals are emitted to the optical signal transmission fiber at the output side, and the single or plural local oscillator lights having a wavelength different from that of the optical signal train are emitted to single or plural intermediate output ports in a one-to-one correspondence with the wavelength. Thereby the optical signal train as a whole is distributed to the optical signal transmission fiber at the output side, and an arbitrary part is distributed to assigned single or plural intermediate output ports.

Particularly for a time-division multiplexing optical signal train by a packet switching system, ATM switching system or the like, information regarding a destination of the packet stored in the header of each packet can be read by the light receiver. Also when two semiconductor laser amplifiers are used, when the header of each packet passes through the semiconductor laser amplifier at the front stage, since the terminal voltage is modulated, information regarding a destination of each packet can be read from the modulation signal. According to the information, the local oscillator lights are emitted by the time each packet passes. After passing through the delay line, each packet is incident to the optical wavelength division multiplexer simultaneously with the local oscillator lights and is multiplexed. After passing through the semiconductor laser amplifier, the local oscillator lights subjected to the strength modulation into the inverted state and the optical signals are incident to an optical wavelength division demultiplexer. The demultiplexer distributes the optical signal train as a whole to the optical signal transmission fiber at the output side, and distributes an arbitrary packet to single or plural intermediate output parts assigned by the header.

BRIEF DESCRIPTION OF THE DRAWINGS

FIG. 1 is a basic constitution diagram of an optical routing system according to a first embodiment of the present invention.

FIG. 2 is a basic constitution diagram of an optical routing system according to a second embodiment of the present invention.

FIG. 3 is a diagram of a time-division multiplexing optical transmission network using the optical routing system in the first and second embodiments of the present invention.

FIG. 4 is a constitution diagram of a packet switching apparatus according to a fourth embodiment of the present invention.

FIG. 5 is a constitution diagram of an embodiment of an optical switch using the packet switching apparatus of FIG. 4.

DETAILED DESCRIPTION

A first embodiment of the present invention is shown in FIG. 1. FIG. 1 is a constitution diagram of an optical routing system. An inverted signal of an arbitrary packet in a time-division multiplexing optical signal train input from a transmission path connected to the input side of the optical routing system can be output to an intermediate output port corresponding to information written in a header of the packet. At the same time the optical signal train as a whole can be output to a transmission path connected to the output side. FIG. 1 illustrates an input side optical signal transmission fiber 1, a front stage semiconductor laser amplifier 2, a delay line 3, an optical wavelength division multiplexer 4, a rear stage semiconductor laser amplifier 5, an optical wavelength division demultiplexer 6, an output side optical signal transmission fiber 7, intermediate output ports 8A, 8B and 8C, a variable wavelength light source controlling circuit 9, and a variable wavelength light source 10. An original optical signal train of wavelength $\lambda_0$ in time-division multiplexing of a number of packets is input from the input side optical signal transmission fiber 1. Passing through the front stage semiconductor laser amplifier 2 to which definite voltage is applied in the forward direction, the terminal voltage is modulated by the original optical signal train. The modulated signal is transmitted to the variable wavelength light source controlling circuit 9. Information relating to a destination of the packet is stored in the header of each packet. The information relating to a destination of the packet may be, for example, information determining either to which of the intermediate output ports 8A, 8B, 8C the packet should be output, or to any of the intermediate output ports 8A, 8B, 8C the packet should not be output. According to the information, the variable wavelength light source controlling circuit 9 operates the variable wavelength light source 10, and local oscillator lights of definite output are emitted at a wavelength in a one-to-one correspondence with the destination of the packet. Wavelength of the local oscillator lights shall be $\lambda_A$, $\lambda_B$, $\lambda_C$ when the destination of the packet is the intermediate output ports 8A, 8B, 8C, respectively. However, if the packet is not output to any of the ports 8A, 8B, 8C, no local oscillator light will be emitted. A definite time delay is generated from the header and passes through the front stage semiconductor laser amplifier 2 until the variable wavelength light source 10 emits the local oscillation lights, but the length of the delay line 3 is determined precisely so that the original optical signal passing through the front stage semiconductor laser amplifier 2 takes the same time to pass through the delay line 3. Therefore the header passing through the delay line 3 and the local oscillator light are simultaneously incident to the optical wavelength division multiplexer 4 and multiplexed, and then incident to the rear stage semiconductor laser amplifier 5 to which definite voltage is applied in the forward direction. Carrier density in the rear stage semiconductor laser amplifier 5 is modulated by the original optical signal within the packet, and the local oscillator light is modulated into its inverted signal. The original optical signal and the modulated local oscillator light are emitted from the rear stage semiconductor laser amplifier 5 and then incident to the optical wavelength division demultiplexer 6. The optical wavelength division demultiplexer 6 is designed to emit lights of wavelength $\lambda_0$ to the output side optical signal transmission fiber 7 and lights of wavelength $\lambda_A$, $\lambda_B$, $\lambda_C$ to the intermediate output ports 8A, 8B, 8C. Therefore the original optical signal within the packet is output to the output side optical signal transmission fiber 7, and its inverted signal is either output to any of the intermediate output ports 8A, 8B, 8C in response to the destination written in the header or not output to any of the ports 8A, 8B, 8C.

The front stage semiconductor laser amplifier 2 and the rear state semiconductor laser amplifier 5 have an inner gain of 28 dB, when the exciting current is 150 mA, and the optical coupling degree at the input/output side is −3.5 dB and the gain between fibers is 21 dB. In the variable wavelength light source controlling circuit 9, a variable wavelength distribution Bragg reflection type laser module having three electrodes is applied. The fiber light output is set to −16 dBm, and the variable width of the wavelength is from 1509 nm to 1512.5 nm, i.e., a variable wavelength width of 3.5 nm or more. The variable wavelength light source controlling circuit 9 is designed so that the variable wavelength light source 10 is oscillated with definite output by 176.7 ns in wavelength 1511, 1512, 1513 nm for three sorts of input signals 0001, 0010, 0011. The optical wavelength division demultiplexer 6 is constituted by a combination of three pieces of 1:1 optical WDM couplers by a Mach-Zehnder interferometer. A first coupler has an input port I1 and output ports O1, O2. The demultiplexing interval is 1 nm, and selective interval of the output port O1 is 1510, 1512, 1514 ... 1550, 1552 ... nm, and selective wavelength of the output port O2 is 1511, 1513, 1515 ... nm. A second coupler has an input port I2 and output ports O3, O4. The demultiplexing interval is 2 nm, and selective wavelength of the output port O3 is 1512, 1516 ... nm, and selective wavelength of the output port O4 is 1510, 1514 ... nm. A third coupler has an input port I3 and output ports O5, O6. The demultiplexing interval is 2 nm, and selective wavelength of the output port O5 is 1513, 1515 ... nm, and selective wavelength of the output port O6 is 1511, 1515 ... nm. Any of the 1:1 optical WDM couplers has insertion loss of selective wavelength being −1 dB and crosstalk being −20 dB. The output ports O1, O2 are connected to the input ports I2, I3 to thereby constitute the optical wavelength division demultiplexer 6. If the optical signals of wavelength 1511, 1512, 1513, 1550 nm are incident to the input port I1, the optical signals of wavelength 1511, 1512, 1513, 1550 nm are output from the output ports O6, O3, O5, O4. Insertion loss of selective wavelength of the optical wavelength division demultiplexer 6 is −3 dB, and the crosstalk is −16 dB. The output ports O6, O3, O5 and O4 are connected to the intermediate output ports 8A, 8B, 8C and the output side optical signal transmission fiber 7. In the optical wavelength division multiplexer 4, a nonpolarization beam splitter is used.

A packet multiplexing optical signal train with wavelength $\lambda_0$ being 1.55 $\mu$m and optical output level in peak value being −20 dB is input to the optical routing system. Optical signals within the packet are NRZ modulation signals with a transmission speed of 2.4 Gb/s and a mark ratio of 1/2. Each packet has a header of 5 bytes and an information part of 48 bytes. Control signals of 0001, 0010, 0011, 0000 are allocated to the header of each packet in this order repeatedly. If the control signals of the header are 0001, 0010, 0011, inverted signals of the optical signals within each packet are obtained to the intermediate output ports 8A, 8B, 8C, and at the same time the optical signals within each packet are output to the output side optical signal transmission fiber 7. Optical output level in the peak value of each inverted signal is 0 dBm, and "1", "0" level ratio is −15 dB or more. Optical output level in the peak value of the optical signal transmission fiber 7 is 3 dBm. If the control signal of the header is 0000, only the optical signal within each packet is output to the output side optical signal transmission fiber 7, and the optical output level in the peak value is 3 dBm.

A second embodiment of the present invention is shown in FIG. 2. FIG. 2 is a constitution diagram of an optical routing system, and inverted signals of an arbitrary packet in a time-division multiplexing optical signal train input from a transmission path connected to the input side of the optical routing system can be output to intermediate output ports of 0, 1, 2, 3 or 4 pieces corresponding to information written in a header of the packet, and at the same time the optical signal train as a whole can be output to a transmission path connected to the output side. FIG. 2 includes an optical power splitter 11, an optical wavelength division multiplexer 12, an optical wavelength division demultiplexer 13, an intermediate output port 14, a light receiver 15, a local oscillator light source group controlling circuit 16, a local oscillator light source group 17, and a semiconductor laser amplifier 18. There are 16 pieces of the intermediate output ports, and the local oscillator light source group 17 is constituted by 16 pieces of local oscillator light sources and wavelength of a light emitted from each local oscillator light source is in a one-to-one correspondence with each intermediate output port. In a manner similar to that of the first embodiment, an original optical signal train of wavelength $\lambda_0$ with a number of packets in time-division multiplexing is input from the input side optical signal transmission fiber 1. A part is branched by the optical power splitter 11 and received by the light receiver 15. The received signal is transmitted to the local oscillator light source group controlling circuit 16. Information relating to a destination of the packet is stored in the header of each packet. That is, information determining either to which of the intermediate output ports 14 the packet should be output, or to any of the intermediate output ports 14 the packet should not be output is stored in the header of each packet. According to the information, the local oscillation light source group controlling circuit 16 operates one or a plurality of local oscillator light sources among the local oscillator light source group 17, and local oscillator lights are emitted. However, when the destination of the packet is the i-th (i being an integer of 1–16) intermediate output port, the local oscillator light source having wavelength $\lambda_i$ is operated and the local oscillator light is emitted. If the packet is not output to any of the ports, no local oscillator light is emitted. After the packet passes through the delay line 3, the header and each local oscillator light are incident simultaneously to the optical wavelength division multiplexer 12 and multiplexed, and then incident to the semiconductor laser amplifier 18 to which definite voltage is applied in the forward direction. In a manner similar to that of the first embodiment, a length of the delay line 3 is determined precisely so that the time delay from the header being branched by the optical power splitter 11 until the local oscillator light source group 17 emitting the local oscillator light can be compensated. The carrier density in the semiconductor laser amplifier 18 is modulated by the original optical signals within the packet, and each local oscillator light is modulated to the inverted signal. The original optical signal and each modulated local oscillator light are emitted from the semiconductor laser amplifier 18, and then incident to the optical wavelength division demultiplexer 13. The optical wavelength division demultiplexer 13 is designed so that light with wavelength $\lambda_0$ is emitted to the output side optical signal transmission fiber 7 and light with wavelength $\lambda_i$ is emitted to the i-th intermediate output port 14. Therefore the original optical signal within the packet is output to the output side optical signal transmission fiber 7, and the inverted signal is output to the intermediate output ports 14 of 0, 1, 2, 3 or 4 pieces in response to the destination written in the header.

The semiconductor laser amplifier 18 has an inner gain of 28 dB, when the exciting current is 150 mA, and the optical coupling degree at the input/output side is $-3.5$ dB and the gain between fibers is 21 dB. The local oscillator light source 17 is constituted by 16 pieces of semiconductor laser modules where the oscillation wavelength is set in intervals of 1 nm from 1523 nm to 1538 nm. The fiber light output is set to each $-16$ dBm. The local oscillator light source 16 is designed so that the selected local oscillator light source 17 is oscillated in definite output by 176.7 ns, for the input signals 000000000000, 000000000001 ... 100111010101 of sorts corresponding to the number when 0, 1, 2, 3 or 4 pieces are selected from 16 pieces of the intermediate output ports 14, i.e., $_{16}C_0+_{16}C_1+ \ldots +_{16}C_4=2517$. The optical wavelength division demultiplexer 13 is constituted in combination of a slab waveguide having converging function with an array waveguide diffraction grating and an input/output waveguide. The array waveguide diffraction grating is constituted by 201 pieces of waveguides where optical path length difference between the neighboring waveguides is 37.14 $\mu$m. It has one input port and 28 output ports, and selective wavelength of each output port is distributed in intervals of 1 nm from 1523 nm to 1550 nm. Insertion loss of the selective wavelength of each output port is $-5-7$ dB and the crosstalk is $-15$ dB. Each output port with selective wavelength from 1523 nm to 1538 nm is connected to the first to sixteenth intermediate output ports 14 in one-to-one correspondence, and the output port with selective wavelength being 1550 nm is connected to the output side optical signal transmission fiber 7. The optical wavelength division multiplexer 12 is constituted by that same as the optical wavelength division demultiplexer 13 in changing between the input side and the output side. Each input port filth selective wavelength from 1523 nm to 1538 nm is connected in one-to-one correspondence to 16 pieces of the semiconductor laser modules with oscillation wavelength from 1523 nm to 1538 nm among the local oscillator light source group 17, and the input port with selective wavelength being 1550 nm is connected to the output side fiber of the semiconductor laser amplifier 18.

The packet multiplexing optical signal train with the wavelength $\lambda_0$ being 1.55 $\mu$m and the light output level in the peak value being 8 dB is input to the optical routing system. The optical signals within the packet are NRZ modulation signals with the transmission speed being 2.4 Gb/s and the mark ratio being 1/2. Each packet has a header of 5 bytes and an information port of 48 bytes. The control signals of 000000000000, 00000000001 ... 100111010101 of 2517 sorts selecting 0, 1, 2, 3 or 4 pieces among 16 pieces of the intermediate output ports 14 are allocated in this order repeatedly to the header of each packet. In response to the control signal of the header, an inverted signal of an optical signal within each packet is obtained, and at the same time, the optical signal within each packet is output to the output side optical signal transmission fiber 7. The light output level in the peak value of each inverted signal is $-9--10$ dBm, and the "1", "0" level ratio is $-15$ dB or more. The light output level in the peak value of the optical signal output to the output side optical signal transmission fiber 7 is $-1$ dBm.

An embodiment of a time-division multiplexing optical transmission network using the optical routing system of the first and second embodiments is shown in FIG. 3. The network of FIG. 3 includes a light transmitter 21, an optical routing system 22 in the first embodiment, an optical routing system 23 in the second embodiment, a light amplifier 24, a single mode optical fiber 25 for transmission, an optical regenerative repeater 26, and light receivers 27a–27m. The light transmitter 21 can transmit a packet multiplexing optical signal train of wavelength 1550 nm constituted by NRZ modulation signals having transmission speed 2.4 Gb/s, wavelength of 1550 nm and mark ratio of 1/2. The fiber light output is set in mean light output level being $-3$ dBm. The single mode optical fiber 25 for transmission is a zero-dispersion shift fiber of 1550 nm band, and the transmission loss is 0.2 dB/km. The light amplifier 24 is a fiber light amplifier which carries out light amplification by an erbium added optical fiber subjected to bidirectional optical excitation by a semiconductor laser of wavelength 1480 nm. Each exciting input to the fiber of the semiconductor laser is 34 mW, and the maximum gain is 33 dB and the compression output of the 3 dB gain is 12 dBm. Each of the light receivers 27a–27m is constituted by a preamplifier IC containing InGaAs-APD module, an equalization amplifier circuit, a timing extraction circuit, a discrimination reproducing circuit, and the maximum light receiving power is $-32$ dBm in the error ratio $10^{-11}$. The optical regenerative repeater 26 is constituted in combination of the light receiver 27 and the light transmitter 24, and has 3R functions, that is, functions of equalization amplifying, retiming and discrimination reproducing. The minimum light receiving power is $-32$ dBm in the error ratio $10^{-11}$, and the mean light output level is $-3$ dBm. In order to transmit different signals to the light receivers 27a–27m, 13 sorts of the packets A–M in this order are repeatedly subjected to time-division multiplexing. Each packet has a header of 5 bytes and an information part of 48 bytes. Control signals of 0001, 0010 ... 1101 are allocated as a destination of the packet to the header of each of the packets A–M. The optical routing system 22 in the first embodiment is set so that the control signals of the header output the packets of 0001, 0010, 0011 to each intermediate output port to which the light receivers 27a, 27b, 27c are connected. The optical routing system 23 in the second embodiment is set so that the control signals of the header output the packets of 0001, 0101 ... 1101 to the intermediate output ports of 1–4 pieces to which the light receivers 27d, 27e ... 27m are connected. A length of the single mode optical fiber 25 for trammission is 100 km between the light transmitter 21 and the optical routing system 22 in the first embodiment, 115 km between the optical routing system 22 in the first embodiment, 100 km between the optical routing system 22 in the first embodiment and the optical regenerative repeater 26, 125 km between the optical regenerative repeater 26 and the light amplifier 24, 100 km between the optical routing system 23 in the second embodiment and the light receivers 27a, 27b ... 27e, 80 km between the optical routing system 22 in the first embodiment and the light receivers 27a, 27b ... 27e, and 50 km between the optical routing system 23 in the second embodiment and the light receivers 27d, 27e ... 27m. As a result of transmitting the packet multiplexing optical signal train from the light transmitter 21, optical signals within the packets A-M are received in a number of light receivers 27a-27m respectively, and clear eye patterns are obtained.

A fourth embodiment of the present invention is shown in FIG. 4. FIG. 4 is a constitution diagram of a packet switching apparatus. An arbitrary packet in a time-division multiplexing optical signal train input from a transmission path connected to the input side of the packet switching apparatus is stored again in an arbitrary time slot, on the premise that two or more packets are not stored in one time slot, and then the stored packet is output from an intermediate output port and the optical signal train itself can be output to a transmission path connected to the output side. The packet switching apparatus of FIG. 4 includes a variable wavelength light source group 31, delay lines 32a–32g, and an intermediate output port 33. A time-division multiplexing optical signal has a wavelength $\lambda_0$ and four time slots, and a packet is stored in each time slot. The optical signal train is input from an input side optical signal transmission fiber 1. Passing through a front stage semiconductor laser amplifier 2 to which definite voltage is applied in the forward direction, the terminal voltage is modulated by the original optical signal train. The modulated signal is transmitted to a variable wavelength light source controlling circuit 9. Information is stored in a header of each packet regarding what number of a time slot the present packet is stored and to what number of a time slot the packet should again be stored. According to the information, the variable wavelength light source controlling circuit 9 operates the variable wavelength light source group 31, and local oscillator lights of definite output are emitted in wavelength in one-to-one correspondence with a moving amount of a time slot in which the packet is to be stored. Wavelength of the local oscillator lights shall be $\lambda_1, \lambda_2 ... \lambda_7$ if the moving amount corresponds to the time slots of 1, 2 ... 7 pieces. After the packet passes through the delay line 3, the header and the local oscillator light are incident to an optical wavelength division multiplexer 4 simultaneously and multiplexed, and then incident to a rear stage semiconductor laser amplifier 5 to which definite voltage is applied in the forward direction. In a manner similar to that of the first embodiment, a length of the delay line 3 is determined precisely so that the time delay from the header passing through the front stage semiconductor laser amplifier 2 until the variable wavelength light source group 31 emitting the local oscillator light can be compensated. Carrier density in the rear stage semiconductor laser amplifier 5 is modulated by the original optical signal within the packet, and the local oscillator light is modulated to the inverted signal. The original optical signal and the modulated local oscillator light are emitted from the rear stage semiconductor laser amplifier 5 and then incident to the optical wavelength division demultiplexer 13. The optical wavelength division demultiplexer 13 is designed so that light with a wavelength $\lambda_0$ is emitted to the output side optical signal transmission fiber 7 and lights with wavelength $\lambda_1, \lambda_2 ... \lambda_7$ are emitted to the delay lines 32a, 32b ... 32g. A length of each of the delay lines 32a, 32b ... 32g is determined precisely so that time corresponding to each of the time slots of 1, 2 ... 7 pieces is required for the optical signal train to pass through the delay lines 32a, 32b ... 32g. The delay lines 32a, 32b ... 32g are multiplexed by the optical wavelength division multiplexer 12 and output to the intermediate output port 33. According to the above-mentioned constitution, an optical signal train with an arbitrary time slot can be obtained from the intermediate output port 33.

The variable wavelength light source group 31 is constituted using two variable wavelength distribution Bragg reflection type laser modules each having three electrodes, and each wavelength variable width is 1523–1526 nm and 1527–1529 nm and by changing both, a wavelength of 1523–1529 nm can be selected. The fiber light output is −16 dBm. The variable wavelength light source controlling circuit 9 is designed so that when the packet is stored in the i-th time slot at present and should be stored again in the j-th time slot next and j-i is −3, −2, −1, 0 1, 2, 3, the variable wavelength light source group 31 is oscillated at definite output by 176.7 ns in wavelength 1523, 1524, 1525, 1526, 1527, 1528, 1529 nm. Among output ports of the optical wavelength division demultiplexer, each output port with selective wavelength from 1523 nm to 1529 nm is connected to the delay lines 32a, 32b ... 32g, and an output port with selective wavelength 1550 nm is connected to the output side optical signal transmission fiber 7.

A packet multiplexing optical signal train with wavelength $\lambda_0$ being 1.55 $\mu$m and light output level in the peak value being −20 dBm is input in the optical routing system. The optical signal train has four time slots, and a packet is stored in each time slot. An optical signal within the packet is NRZ modulation signal with transmission speed being 2.4 Gb/s and mark ratio being 1/2. Each packet has a header of 5 bytes and an information part of 48 bytes. The number of the time slot storing the packet at present is allocated to the first byte of the header of each packet, and the number of the time slot to store the packet next is allocated to the second byte. In order that the packets in the first, second, third and fourth time slots are stored again in the fourth, second, third and first time slots, each of the control signals of 00010100, 00100010, 00110011, 01000001 is allocated. Inverted signals with packets in the first, second, third and fourth time slots among the packet multiplexing optical signal train being stored again in the fourth, second, third and first time slots are obtained from the intermediate output port 33, and at the same time the input packet multiplexing optical signal train is output to the output side optical signal transmission fiber 7. The light output level in the peak value of each inverted signal is −15 dB or more. The light output level in the peak value of the optical signal output to the output side optical signal transmission fiber 7 is −1 dBm.

An embodiment of an optical switch using the packet switching apparatus in the fourth embodiment is shown in FIG. 5. In FIG. 5, numerals 41a–41b designate optical switches, numerals 42a, 42b designate packet switching apparatuses in the fourth embodiment, numerals 43a, 43b designate input side optical signal transmission fibers, and numerals 44a, 44b designate output side optical signal transmission fibers. A packet multiplexing optical signal train to be input or output has four time slots, and a packet is stored in each time slot. In a packet multiplexing optical signal train input from the input side optical signal transmission fiber 43a, by the optical 41a, packets in the first and third time slots are input to the packet switching apparatus 42a of the fourth embodiment, and packets in the second and fourth time slots are input to the packet switching apparatus 42b of the fourth embodiment. In a packet multiplexing optical signal transmission fiber 43b, by the optical switch 41a, packets in the first and third time slots are input to the packet switching apparatus 42b of the fourth embodiment, and packets in the second and fourth time slots are input to the packet switching apparatus 42a of the fourth embodiment. In the packet switching apparatuses 42a, 42b of the fourth embodiment, inverted signals within each slot are stored again in the assigned time slot. In the inverted signal output from the intermediate output of the packet switching apparatus 42a of the fourth embodiment, by the optical switch 41b, packets in the first and third time slots are output to the output side optical fiber 44a, and packets in the second and fourth time slots are output to the output side transmission fiber 44b. In the inverted signal output from the intermediate output port of the packet switching apparatus 42b of the fourth embodiment, by the optical switch 41b, packets in the first and third time slots are output to the output side optical signal transmission fiber 44b, and packets in the second and fourth time slots are output to the output side optical signal transmission fiber 44a.

The optical switches 41a, 41b are LiNbO$_3$ 2×2 optical switches, and insertion loss between input/output ports is 1-2 dB and extinction ratio is 20-25 dB. A packet multiplexing optical signal train with wavelength $\lambda_0$ being 1.55 μm and light output level in the peak value being −18 dBm is input to the input side optical signal trammission fibers 43a, 43b of the optical switch. The optical signal train has four time slots, and a packet is stored in each time slot. Optical signals within the packet are NRZ modulation signals of transmission speed of 2.4 Gb/s and mark ratio of 1/2. Each packet has a header of 5 bytes and an information part of 48 bytes. The number of the time slot storing the packet at present is allocated to the first byte of the header of each packet, and the number of the time slot to store the packet next is allocated to the second byte. Study has been carried out in the case that among packets input from the input side optical signal trammission fiber 43a, packets in the first and fourth time slots are output to the output side optical signal trammission fiber 44b, and other packets are output to the output side optical signal trammission fiber 44a, and that among packets input from the input side optical signal trammission fiber 43b, packets in the first and fourth time slots are output to the output side optical signal trammission fiber 44a, and other packets are output to the output side optical signal trammission fiber 44b. Each of the control signals 00010100, 00100010, 00110011, 01000001 is allocated to header of packets in the first, second, third and fourth time slots input from the input side optical signal trammission fibers 43a, 43b. Packets in the first, second, third and fourth time slots input to the packet switching apparatuses 42a, 42b of the fourth embodiment are together stored again in the fourth, second, third and first time slots. Inverted signals within packets in the first and fourth time slots input from the input side optical signal transmission fiber 43a and within packets in the second and third time slots input from the input side optical signal transmission fiber 43b are output to the output side optical signal transmission fiber 44b, and inverted signals within packets in the second and third time slots input from the input side optical signal transmission fiber 43a and within packets in the first and fourth time slots input from the input side optical signal transmission fiber 43b are output to the output side optical signal transmission fiber 44a. Light output level in the peak value of each inverted signal is −12 - −13 dBm, and the "1", "0" level ratio is 15 dB or more.

According to the present invention, in an optical routing system to be applied as a distribution node in a time-division multiplexing optical signal transmission network according to a line switching system, ATM switching system or the like, even if the distribution number is increased, deterioration of S/N ratio at input/output side is little or a number of optical active elements are not required and while an optical signal train as a whole is preserved a specified part or a packet can be distributed, thereby a time-division multiplexing optical transmission network according to line switching system of large scale and high speed or packet switching system, ATM switching system or the like can be constituted by relatively free layout and low cost, and application to optical communication network in subscriber system or repeating system or optical local area network becomes possible.

What is claimed is:

1. An optical routing system installed on a transmission path of a time-division multiplexing optical signal train, comprising:
   a variable wavelength light source emitting a local oscillator light in correspondence with the time-division multiplexing optical signal train;
   an optical wavelength division multiplexer multiplexing the local oscillator light with the time-division multiplexing optical signal train;
   a semiconductor optical amplifier coupled to the optical wavelength division multiplexer, modulating the multiplexed local oscillator light into an inverted signal; and
   an optical wavelength division demultiplexer coupled to the semiconductor optical amplifier, demultiplexing the inverted signal from the time-division multiplexing optical signal train.

2. An optical routing system according to claim 1, further comprising:
   a front stage semiconductor laser amplifier coupled to the variable wavelength light source in a front stage, passing the time-division multiplexing optical signal train therethrough; and
   a variable wavelength light source controlling circuit controlling the variable wavelength light source based on a terminal voltage of the front stage semiconductor laser.

3. An optical routing system installed on a transmission path of a time-division multiplexing optical signal train, comprising:
   a local oscillator light source group emitting a local oscillator light in correspondence with the time-division multiplexing optical signal train;
   an optical wavelength division multiplexer multiplexing the local oscillator light with the time-division multiplexing optical signal train;
   a semiconductor optical amplifier coupled to the optical wavelength division multiplexer, modulating the multiplexed local oscillator light into an inverted signal; and
   an optical wavelength division demultiplexer coupled to the semiconductor optical amplifier, demultiplexing the inverted signal from the time-division multiplexing optical signal train.

4. An optical routing system according to claim 3, further comprising:
   an optical power splitter coupled to the variable wavelength light source in a front stage, splitting the time-division multiplexing optical signal train; and
   a local oscillator light source group controlling circuit controlling the local oscillator light source group based on the split optical signal train.

5. An optical routing system installed on a transmission path of a time-division multiplexing optical signal train, comprising:
   a local oscillator outputting a local light signal;
   an optical wavelength division multiplexer multiplexing the local light signal with the time-division multiplexing optical signal train;
   a semiconductor optical amplifier coupled to the optical wavelength division multiplexer, modulating the multiplexed local light signal into an inverted signal; and
   an optical wavelength division demultiplexer coupled to the semiconductor optical amplifier, demultiplexing the inverted signal from the time-division multiplexing optical signal train.

6. A time-division multiplexing optical transmission network comprising:
   a light transmitter;
   a first optical routing system coupled to the light transmitter; and
   a second optical routing system coupled to the first optical routing system;
   wherein the first optical routing system comprises:
      a variable wavelength light source emitting a first local oscillator light in correspondence with a time-division multiplexing optical signal train;
      a first optical wavelength division multiplexer multiplexing the first local oscillator light with the time-division multiplexing optical signal train;
      a first semiconductor optical amplifier coupled to the first optical wavelength division multiplexer, modulating the multiplexed first local oscillator light into a first inverted signal; and
      a first optical wavelength division demultiplexer coupled to the first semiconductor optical amplifier, demultiplexing the first inverted signal from the time-division multiplexing optical signal train; and
   wherein the second optical routing system comprises:
      a local oscillator light source group emitting a second local oscillator light in correspondence with the time-division multiplexing optical signal train;
      a second optical wavelength division multiplexer multiplexing the second local oscillator light with the time-division multiplexing optical signal train;
      a second semiconductor optical amplifier coupled to the second optical wavelength division multiplexer, modulating the multiplexed second local oscillator light into a second inverted signal; and
      a second optical wavelength division demultiplexer coupled to the second semiconductor optical amplifier, demultiplexing the second inverted signal from the time-division multiplexing optical signal train.

7. A time-division multiplexing optical transmission network comprising:
   a light transmitter;
   an optical routing system coupled to the light transmitter, comprising a local oscillator outputting a local light signal, an optical wavelength division multiplexer multiplexing the local light signal with a time-division multiplexing optical signal train, a semiconductor optical amplifier coupled to the optical wavelength division multiplexer, modulating the multiplexed local light signal into an inverted signal, and an optical wavelength division demultiplexer coupled to the semiconductor optical amplifier, demultiplexing the inverted signal from the time-division multiplexing optical signal train; and
   a plurality of light receivers coupled to the optical routing system, wherein at least one of the light receivers receives the inverted signal.

8. A packet switching apparatus for switching packets in a time-division multiplexing optical signal train, comprising:
   a variable wavelength light source group emitting a plurality of local oscillator lights in correspondence with the time-division multiplexing optical signal train;
   an optical wavelength division multiplexer multiplexing the local oscillator lights with the time-division multiplexing optical signal train;
   a semiconductor optical amplifier coupled to the optical wavelength division multiplexer, modulating the multiplexed local oscillator lights into a plurality of inverted signals;
   an optical wavelength division demultiplexer coupled to the semiconductor optical amplifier, demultiplexing the inverted signals from the time-division multiplexing optical signal train;
   a plurality of delay lines coupled to the optical wavelength division demultiplexer, delaying the respective inverted signals with different delay times; and
   a multiplexer multiplexing the delayed inverted signals together to obtain an optical signal train with an arbitrary time slot.

9. A packet switching apparatus according to claim 8, further comprising:
   a front stage semiconductor laser amplifier coupled to the variable wavelength light source group in a front stage, passing the time-division multiplexing optical signal train therethrough; and
   a variable wavelength light source controlling circuit controlling the variable wavelength light source group based on a terminal voltage of the front stage semiconductor laser.

10. An optical switch system comprising:
   a first optical switch coupled to a first input side optical signal transmission fiber and a second input side optical signal transmission fiber;
   a second optical switch coupled to a first output side optical signal transmission fiber and a second output side optical signal transmission fiber;
   a first optical switch apparatus coupled between the first and second optical switches; and
   a second optical switch apparatus coupled between the first and second optical switches;
   wherein each of the first and second optical switch apparatuses comprises:
      a variable wavelength light source group emitting a plurality of local oscillator lights in correspondence with the time-division multiplexing optical signal train;

an optical wavelength division multiplexer multiplexing the local oscillator lights with the time-division multiplexing optical signal train;

a semiconductor optical amplifier coupled to the optical wavelength division multiplexer, modulating the multiplexed local oscillator lights into a plurality of inverted signals;

an optical wavelength division demultiplexer coupled to the semiconductor optical amplifier, demultiplexing the inverted signals from the time-division multiplexing optical signal train;

a plurality of delay lines coupled to the optical wavelength division demultiplexer, delaying the respective inverted signals with different delay times; and a multiplexer multiplexing the delayed inverted signals together to obtain an optical signal train with an arbitrary time slot.

* * * * *

UNITED STATES PATENT AND TRADEMARK OFFICE
CERTIFICATE OF CORRECTION

PATENT NO. : 5,438,444  
DATED : August 1, 1995  
INVENTOR(S) : Takashi TAYONAKA et al.

It is certified that error appears in the above-identified patent and that said Letters Patent is hereby corrected as shown below:

| Column | Line | |
|--------|------|---|
| 2  | 7  | Change "little" to --minimal--. |
| 2  | 67 | Change "little" to --minimal--. |
| 7  | 42 | Delete "by". |
| 7  | 43 | Change "that" to --the--. |
| 7  | 45 | Change "filth" to --fifth--. |
| 8  | 57 | Change "trammission" to --transmission--. |
| 11 | 48 | Change "trammission" to --transmission--. |
| 11 | 50 | Change "trammission" to --transmission--. |
| 11 | 51 | Change "trammission" to --transmission--. |
| 11 | 55 | Change "trammission" to --transmission--. |
| 12 | 12 | Change "little" to --minimal--. |

UNITED STATES PATENT AND TRADEMARK OFFICE
CERTIFICATE OF CORRECTION

PATENT NO. : 5,438,444
DATED : August 1, 1995
INVENTOR(S) : Takashi TAYONAKA et al.

It is certified that error appears in the above-identified patent and that said Letters Patent is hereby corrected as shown below:

| Column | Line | |
|---|---|---|
| 12 | 14 | After "preserved" insert --,--. |
| 12 | 19 | Before "low" insert --at--. |
| 12 | 20 | Before "optical" insert --an--. |
| 12 | 21 | After "in" insert --a--. |

Signed and Sealed this

Third Day of September, 1996

Attest:

BRUCE LEHMAN

Attesting Officer    Commissioner of Patents and Trademarks